A. SERCELY.
VALVE FOR RADIATORS.
APPLICATION FILED MAR. 2, 1908.
912,188.
Patented Feb. 9, 1909.
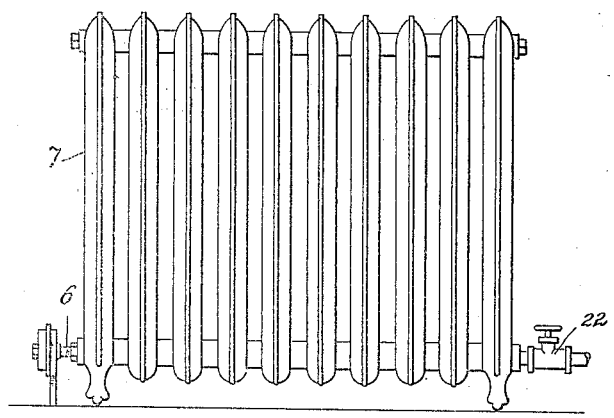
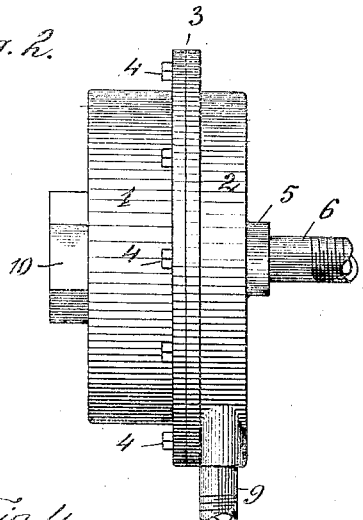
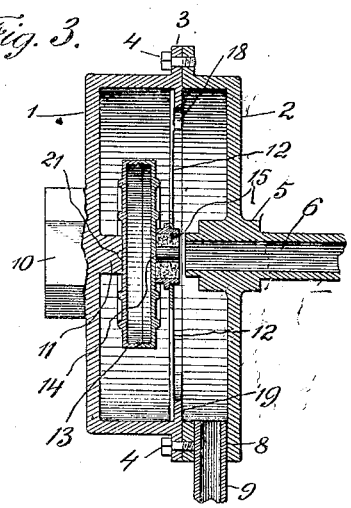
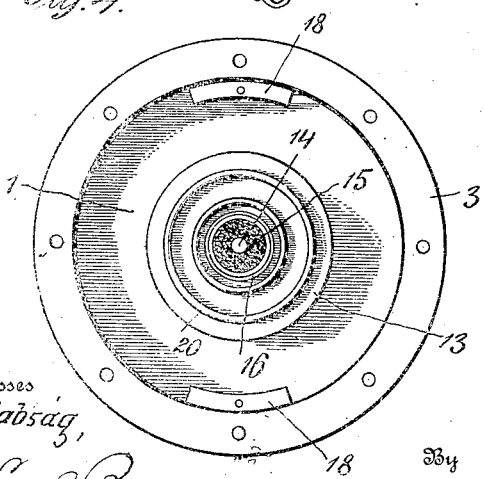
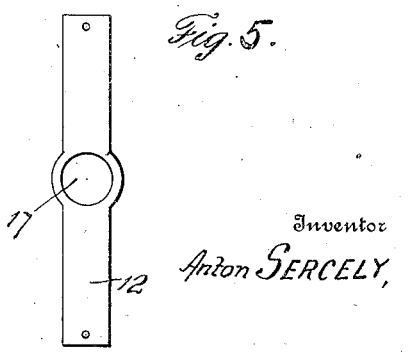
Witnesses
A. H. Rabsag,
R. H. Butler
Inventor
Anton SERCELY,
By H. Everett
Attorneys

UNITED STATES PATENT OFFICE.

ANTON SERCELY, OF PITTSBURG, PENNSYLVANIA, ASSIGNOR OF ONE-HALF TO ERNEST JUTT, OF PITTSBURG, PENNSYLVANIA.

VALVE FOR RADIATORS.

No. 912,188.  Specification of Letters Patent.  Patented Feb. 9, 1909.

Application filed March 2, 1908. Serial No. 418,826.

*To all whom it may concern:*

Be it known that I, ANTON SERCELY, a subject of the Emperor of Austria-Hungary, residing at Pittsburg, in the county of Allegheny and State of Pennsylvania, have invented certain new and useful Improvements in Valves for Radiators, of which the following is a specification, reference being had therein to the accompanying drawing.

This invention relates to thermostatic valves, and the primary object of my invention is, to provide a novel valve for controlling the exhaust of radiators.

A still further object of my invention is to provide a simple and effective valve of the above type, wherein a spring-held diaphragm is adapted to form a closure for a pipe.

With the above and other objects in view which will more readily appear as the invention is better understood, the same consists in the novel construction, combination and arrangement of parts to be presently described and then specifically pointed out in the appended claim.

In the drawings: Figure 1 is an elevation of a radiator equipped with my thermostatic valve, Fig. 2 is a side elevation of the valve, as detached from the radiator, Fig. 3 is a vertical sectional view of the same, Fig. 4 is a front elevation of the main section of the valve, and Fig. 5 is a similar view of a flat spring used in connection with the valve.

In carrying my invention into effect, I provide a casing comprising two sections 1 and 2 having peripheral flanges 3 adapted to be connected together by screw bolts 4. The section 2 is formed with a central boss or sleeve 5 constituting the exhaust pipe 6 of a radiator 7. The lower edge of the section 2 is formed with a boss or sleeve 8 for a drain pipe 9, said pipe being retained in the boss or sleeve 8 by one of the screw bolts 4 employed for connecting the sections 1 and 2. The section 1 is formed with a central exterior enlargement 10 and with a central interior projection or stud 11. When the sections 1 and 2 have been secured together, the casing may be rotated by applying a wrench or the like to the enlargement or nut 10 to screw the exhaust pipe 6 into the radiator. Held in engagement with the projection or stud 11 by a flat spring 12 is a diaphragm or drum having a central pin 14 surrounded by a packing 15 and a flanged sleeve fitting in an opening 17, provided therefor in the spring 12. The spring 12 is secured to diametrically opposed lugs 18 carried by the section 1, rivets or similar fastening means 19 being employed for securing the springs to said lugs.

The pin 14, packing 15 and sleeve 16 constitute a valve for engagement with the end of the exhaust pipe 6. When steam is admitted to the radiator it flows through the sections thereof and entering the casing formed by sections 1 and 2, serves to expand the diaphragm 13 so as to force the valve carried thereby against the outlet end of the exhaust pipe 6 and close the same. This action takes place almost immediately upon steam entering the casing, and, as soon as the exhaust pipe is closed, escape of live steam through the casing is prevented.

The diaphragm or drum 13 is constructed of two parts, each part being made of light and durable metal susceptible to expansion and contraction when subjected to heat or cold. The parts of the drum or diaphragm are provided with exterior circular ribs 20, while that part of the diaphragm which engages the projection 11 is provided with a teat 21 adapted to engage in said projection.

When steam is admitted to the radiator 7 through the controlling valve 22, it passes through the radiator and impinges upon the diaphragm or drum 13, expanding the same and forcing the packing 15 against the end of the sleeve 5, closing the pipe 6 and retaining the steam in the radiator 7. When the steam is shut off from the radiator 7 by closing the valve 22, the pressure of steam against the diaphragm or drum 13 is reduced, and the diaphragm will cool and contract, opening the end of the pipe 6 and allowing the condensate to pass from the radiator into the sections 1 and 2 of the valve and then into the drain pipe 9. The spring 12 remains under tension as long as the diaphragm or drum 13 is expanded and always retains said drum or diaphragm in engagement with the projection 11 of the valve section 1. Since the sections 1 and 2 of the valve can be separated, the packing 15 can be easily renewed.

Having now described my invention what I claim as new, is:—

A valve of the class described comprising a casing formed of a pair of cup-shaped sections, each of which is provided with a laterally extending flange, said flanges abutting, a plurality of hold fast devices for detachably connecting said flanges together, one of said sections being provided approximately centrally thereof with an integral sleeve constituting an exhaust pipe and projecting into and out of said section, a drain pipe extending in said vertical boss, one of said hold fast devices constituting means for securing said drain pipe in position, an inwardly extending projection and an inwardly extending annular flange carried by the other of said sections, said annular flange extending at right angles to said projection, a drum-shaped diaphragm adapted to bear against said projection, a pin carried by and being arranged centrally of one end of said diaphragm, a packing surrounding said pin, said packing arranged in close proximity to the inner end of said exhaust pipe, a sleeve surrounding said packing and having a flange intermediate its ends, a transversely extending flat spring arranged within one of said sections, and having an enlarged portion centrally thereof provided with an opening, said spring abutting against the flange of the sleeve and being mounted upon said inwardly extending annular flange formed on one of said sections and being adapted to hold said diaphragm in engagement with said projection and to hold said packing in close proximity to the inner end of said exhaust pipe.

In testimony whereof I affix my signature in the presence of two witnesses.

ANTON SERCELY.

Witnesses:
 MAX H. SROLOVITZ,
 A. J. TRIGG.